(12) United States Patent  (10) Patent No.: US 8,463,431 B2
Segal et al. (45) Date of Patent: Jun. 11, 2013

(54) CUSTOMER RETENTION SYSTEM AND PROCESS IN A VENDING UNIT, RETAIL DISPLAY OR AUTOMATED RETAIL STORE

(75) Inventors: Mara Clair Segal, San Francisco, CA (US); Darrell Scott Mockus, San Francisco, CA (US); Russell Jon Greenberg, New York, NY (US)

(73) Assignee: Utique, Inc., San Francisco, CA (US)

( * ) Notice: Subject to any disclaimer, the term of this patent is extended or adjusted under 35 U.S.C. 154(b) by 272 days.

(21) Appl. No.: 12/798,803

(22) Filed: Apr. 12, 2010

(65) Prior Publication Data

US 2010/0262282 A1 Oct. 14, 2010

Related U.S. Application Data

(60) Provisional application No. 61/168,838, filed on Apr. 13, 2009.

(51) Int. Cl.
*G06F 17/00* (2006.01)

(52) U.S. Cl.
USPC ............ 700/237; 700/236; 700/240; 700/241

(58) Field of Classification Search
USPC .......................... 700/232, 236, 237, 240, 241
See application file for complete search history.

(56) References Cited

U.S. PATENT DOCUMENTS

| | | | | |
|---|---|---|---|---|
| 5,831,862 A | * | 11/1998 | Hetrick et al. | 700/232 |
| 5,988,346 A | * | 11/1999 | Tedesco et al. | 700/237 |
| 6,424,884 B1 | * | 7/2002 | Brooke et al. | 700/232 |
| 6,695,166 B2 | * | 2/2004 | Long | 700/238 |
| 6,792,334 B2 | * | 9/2004 | Metcalf et al. | 700/237 |
| 7,299,109 B2 | * | 11/2007 | Juds et al. | 700/238 |
| 7,366,586 B2 | * | 4/2008 | Kaplan et al. | 700/241 |
| 7,577,496 B2 | * | 8/2009 | Walker et al. | 700/236 |
| 7,756,604 B1 | * | 7/2010 | Davis et al. | 700/240 |

* cited by examiner

*Primary Examiner* — Timothy Waggoner
(74) *Attorney, Agent, or Firm* — Kenneth S. Roberts; One LLP

(57) ABSTRACT

A vending system comprising numerous remote vending machines, retail displays, and automated retail stores connected to a communication network access a central database so that each remote machine provides and responds to personalized customer information. Each machine comprises a display containing products to be vended and a plurality of touchable product viewing areas for initiating a vend. A computer recognizes customer data derived from peripheral inputs. Software communicates with the database for establishing customer profiles and either recognizing customers or registering customers by generating a global unique identifier. Subroutines initiate the dispensing of items in response to preselected conditions associated with each GUID.

4 Claims, 9 Drawing Sheets

CUSTOMER RETENTION SYSTEM AND PROCESS IN A VENDING UNIT, RETAIL DISPLAY OR AUTOMATED RETAIL STORE

CROSS-REFERENCE TO RELATED APPLICATION

This application is based upon pending U.S. Provisional Application Ser. No. 61/168,838 filed Apr. 13, 2009, and entitled "Customer Retention System And Automated Retail Store (Kiosk, Vending Unit, Automated Retail Display And Point-Of-Sale)", by coinventors Darrell Scott Mockus, Mara Segal and Russell Greenberg, and priority based on said application is claimed.

BACKGROUND OF THE INVENTION

1. Field of the Invention

The present invention relates generally to automated vending machines. More particularly, the present invention relates to smart, computer controlled interactive vending machines equipped with a method and system for capturing and retaining consumer information and for authenticating returning consumers in conjunction with automated retail and or interactive retail deployments and retail displays.

2. Description of the Related Art

Numerous prior art vending machines exist for selling or vending diverse products through an automated, or 'self-service' format. Vending reached popularity in the late 1800's with coin-operated devices dispensing diverse merchandise. More recently vending machines have evolved to include robotic dispensing components, and/or PCs and virtual interfaces. These new vending platforms have emerged in the marketplace under the popular descriptions "automated retail," "interactive retail," and/or "interactive retail displays." Such vending machines may be deployed within a variety of retail or commercial settings. They typically include illuminated, visual displays that seek to attract and educate customers or potential customers. Product information may be customer-requested utilizing interactive displays, including touch screen computer interfaces and virtual interfaces.

Current automated retail units are assembled as single integrated, or stand-alone store units with merchandising displays and mechanical components integrated into a single platform. Typical platforms provide an interface with a single touch screen with limited peripherals (such as a keyboard). This makes entering complex data (usernames, passwords, addresses, preference information) difficult. Usually only minimal customer data is inputted to initiate a vend. Historically, vending and automated retail machines do not have a viable method or process for associating specific repeat customers to previous sales, preferences and reward programs, in part because of the lack of properly accumulated and inventoried customer data. Customer profiling has not been emphasized in the vending arts.

Unlike normal stores, staffed with experienced sales people that often recognize and greet repeat customers accordingly, vending machines can be quite impersonal. Successful sales people know certain things that a repeat customer likes or dislikes. Store personnel understand customer personalities, so they can recommend various items. Sales personnel can recommend products that a customer might want to try, based upon that customers' past performance. Thus in normal retail outlets, experienced sales personnel, armed with information concerning the habits and preferences of repeat customers, provide superior services and benefits to customers, while enhancing store goodwill and maximizing establishment revenue.

Self-service, automated vending machines can no doubt benefit by emulating the "personal touch" normally provided by human interaction in typical retail stores. We have determined that there is a value in having an easy-to-use customer retention program in a self-service vending unit, that familiarizes the vending unit with the likes and dislikes of repeat customers, based upon information gleaned from past customer interactions.

Product suppliers want to connect to their customer base. Brand-preferences are strong with some customers. In the prior art there is no easy way for customers to currently indicate their interest in a given brand at the time of purchase, and to communicate their contact information. This is usually done afterwards through product registrations via postal mail. Sign up processes online are difficult, requiring multiple steps that are time consuming.

It is thus desirable to provide a method and system for customer retention that is efficient and easy to use in a self-service machine such as automated retail store, retail kiosk, interactive digital signage system, etc. It is further desirable for such a system to use a variety of personally identifiable information to authenticate a user on a self-service machine to provide access to member benefits and privileges. It is also desirable to limit abuse of those benefits and privileges.

BRIEF SUMMARY OF THE INVENTION

This invention provides an improved method for users of a self-service vending system to establish and manage a customer profile, and to become part of a membership program that gives them instant access to rewards, discounts and free products.

Data may be inputted through a magnetic card reader, RFID reader, or Bluetooth receiving unit that reads personal identifying information. Peripheral input devices such as touch screens and/or keypads may input information as well. The software utilizes a centralized database connected via a wireless or wired connection that stores inputted customer data for later use at any one of numerous, connected self-service stations.

A software algorithm generates a global unique identifier (GUID) for individual customers that uniquely identifies the user across all machines and platforms. The GUID is derived from personally identifiable information such as part of a credit card number, a non-identifying calculated number based off that number, a user's name, or an email address. An advantage is that, while the GUID is uniquely derived in part from personal information, it contains no identifiable personal information. By design, information such as a user profile and buying habits can be attached to the GUID. The system allows for a multitude of identifying options the user may select—each is globally unique. This means that the pieces that make up the identifying information are structured in a way that there are no duplicates and that a user can properly restrict this access in a secure way.

For example, a unique combination can result from a portion of information taken from a user's credit card that can be combined with an email address. The email address is unique because of general domain and interne system requirements. A credit card provides security in that a person must be in possession of it to access the system. These two pieces of information used in concert provide an adequately secure way to access the system. Another possible combination could be a cell phone number and a personal identification number (PIN) selected by the user. The cell phone number provides a globally unique item and the PIN provides a level of security. A fingerprint is considered unique and secure. The system can however can pair a fingerprint scan with a pass phrase to compensate for any limitations in the technology to read a unique fingerprint. The system can also use its built-in camera for facial recognition. Because of limitations in technology and the naturally occurring phenomenon of identical twins, this facial recognition can also be paired with a PIN or pass phrase. The system can also read the Media Access Control address (MAC address) from wireless enabled devices. The MAC addresses are designed to be unique, but because they can be altered by users, this MAC address is paired with a PIN or pass phrase to make it both unique and secure. The system can be altered at any time to add additional methods of unique and secure identification, but the process remains the same.

The multiple authentication options of the preferred invention allows for a superior consumer experience. Consumers can associate different methods of identifying themselves to a registered account. This invention offers several advantages. One advantage is that users can easily sign up with minimal manual input. Another advantage is that a user can choose the method that suits their individual preferences. Users also have multiple options of identifying with a machine in case they forgot one of their identification methods.

The connection of all machines on a network to a centralized data repository and system allows a fluid consumer experience across multiple automated retail stores or digital signage environments. This is a great advantage as a user's preferences are acknowledged at any location where they identify themselves with their registered account. One advantage is that the user's buying preferences are recognized during their user session. These may include options to quickly purchase frequently bought items, the highlighting of categories of products that are of interest and the de-emphasis of products and items are of little interest to the user. Another advantage is the recommendation or special product offers on products that may interest the user based on current usage, previous purchases or historical usage patterns. Users may also accumulate various status levels based on their patronage. Each time a user identifies themselves on a machine and purchases merchandise or samples or tries qualifying items, they receive points that are associated with their account. These points may be traded in for merchandise, discounts or other benefits as determined by administrative marketing personnel.

The preferred invention provides a system and mechanism to prevent the abuse of a free sample dispensing program. In an automated machine, it is important to control the free distribution of any product or item. The invention makes the membership registration process compulsory, requiring any user requesting a sample to be an existing registered user or sign up to become one. The membership process uses items that are globally unique, and the majority of users would rarely have more than one. Examples of these could include but are not limited to cell phone numbers, credit cards, MAC addresses on wireless devices. Because of this, it is difficult for a single user to register more than once. Samples are entered into the data system using a unique product identifier in the system. Each sample type is associated with a full sized retail version of the product that is also identified in the system using a unique identifier. Each time a sample is dispensed, the user id, sample id, date and dispense location are logged in a data file that is centrally stored and retrievable by any machine connected to the system. Once a user is registered, sample deliver can be controlled to a given rule set. Some implemented rules may include but are not limited to only sample type per registered user and only one sample a day per registered user. Sample id type, registered user and the date are logged during sample dispensing so product purchases by registered users who identify themselves on the system can be tracked linking purchases to giveaways. These numbers can be analyzed to determine marketing effectiveness by an automated routine or by a manual process.

Another advantage of the preferred system is that the advanced recording and logging of user actions can be associated with a specific user to enhance the consumer's experience. Motion sensors and touch sensors mounted in the machine can sense various user interactions with the machine. Each of these events are recorded and logged by the system. When a registered user identifies themselves on a machine, the interactions can be associated with a specific user. This information can be correlated in real time or after a user's session. to enhance the consumer experience. The information used can be a collection of a registered user's entire interaction history, sub segments of that history, or it can be based on current actions. Examples of an enhanced user experience include:

a) broadcast promotions and sales to the registered user's contact information based on a collection of aggregated data of the user's actions over a period of time.

b) up-sell or cross sell products that are related to the products, items or brands in which the user showed interest based on the recorded actions c) group frequent or repeat purchase items into a custom easy to select button on the touch screen so a user can quickly purchase the items they want.

d) provide on screen product recommendations based on what products or brands were viewed, selected, added to the list for purchase and purchased.

e) display videos, text messages, image messages on the touch screen or through the audio system providing more information on products, brands and items in which the user has shown an interest through a collection of their actions over a period of time.

The preferred invention also allows users to communicate with other contacts not registered on the system, or to communicate directly with other registered users of the system. Examples of enhanced user options include the ability to:

a) send a cell phone text message (SMS), an email or other electronic communication message to another person containing a product, item or brand recommendation directly from the machine by entering in the contact information of the other person. If the contact information matches the contact information of another registered user, the current user will also be provided the option to message the user on the local system. In this case, a message would be presented to the user when they use any machine or log into the linked website.

b) post a recommendation, viewing action, or purchase action on a machine to a website, social networking website, news feed, message board or any other election posting system by linking their member registration to their external account that gives them the proper permissions to post.

c) purchase a gift for another person and send them a message on how to receive the product. The message will contain a code that a user can enter into any machine that will present the gift which may be a credit amount redeemable for selected merchandise in the machine or a specific product or group of products subject to availability.

Preferably, the process is initiated when a user selects a membership digital button on the touch screen, or attempts to exercise a membership privilege, such as receiving a free product sample. The user is then prompted for some identifying information that will uniquely identify the consumer as a returning user. These could be any of the following: a credit card, an ID card with an encoded magnetic stripe, a cell phone number, a wireless device with a unique Media Access Control (MAC) address, facial recognition scan, fingerprint scan or any other mechanism that is proven to be unique and identifiable to one person as previously described. Depending on the mechanism, an additional information point such as a password, pass phrase or personal identification number (PIN) may be used in combination with the unique element to ensure it is securely linked to the correct registered user. This step further minimizes the risk of fraudulent attempts.

The invention consists of a series of merchandise display, promotional/digital signage, automated mechanical/dispensing, and/or transactional modules that can be assembled and configured to create an automated retail store, or interactive retail display of any size and link together via an virtual integrated network.

The invention also allows for a user to register on any machine and access their information, receive member benefits on any other machine on the network. All member activity can be tracked across every machine deployed on the network and in real-time regardless of where the user originally registered. In addition, membership restrictions can be imposed and enforced system wide.

Thus a basic object of our invention is to provide a more effective consumer retail experience on an automated vending machine or interactive retail display.

Another important object is to provide an interactive retail display in the form of a vending machine that uses interactive lighting and produces variable lighting effects in response to user inputs.

Other objects are as follows:

a) to provide a system that can easily and cost effectively allow users of a kiosk, vending unit, automated retail store, digital signage unit, POS system or similar self service system to sign up for membership or 'club' program using an identifying card (e.g. credit card, license, magnetic or RFID card, etc.) and a user interface to identify themselves and sign up and be recognized as a returning user.

b) to provide a method of which users can "register" and/or "sign up" for a membership program on an automated kiosk.

c) to provide a method for which member users can get instant access to product samples.

d) to provide a method for which member users can get discounts.

e) to provide a method for which member users can accumulate "points" or "credits" for purchases made that can be applied to benefits such as discounts, free products or other offerings.

f) to provide a method for which members can select and/or connect to brand partners in which they are interested.

g) to provide a method for storing member selections including preferred brands, or products in a database that can be accessed remotely or referenced in during the member's interaction with the kiosk to enhance consumer experience through product recommendations, user presentation and/or specials/deals.

h) to provide a method for which various means of personal identification such as an identifying magnetic stripe card (credit card, license, government id, membership id card, etc.), RFID device (cell phone, smart card, mobile device), Bluetooth enabled device (cell phone, mobile device, etc.) or infrared signaling device (cell phone, mobile device, etc.) can be used to sign up for/register and later be used to be recognized when returning.

i) to provide a method for tracking user behavior in a kiosk and leveraging behavior tracking to cross-sell, up-sell, and deepen with the consumer.

j) to provide a method that allows a registered user's actions to be logged and recorded.

k) to provide a method that allows a registered user's actions with a touch screen interface to be associated with a consumer profile.

l) to provide a method that allows the use of motion sensors to track consumer movements and associate these actions with a consumer profile.

m) to provide a method that allows the use of touch sensors to track consumer actions and associate these actions with a consumer profile.

n) to provide a method that allows the recorded actions of a registered user to be used to customize the user's retail experience.

o) to facilitate user interactions with the automated vending process or retail display by providing a visual reminder of products that have already been selected or previously purchased in another session by the user on the touch screen so that they can be easily purchased again.

p) to provide the ability for a user to customize their own experience through voluntary information input.

q) to provide the ability for a user to manage their methods of contact which may include but are not limited to email address, phone, cell phone, facsimile machine phone number, social media website user identification, or mailing address.

r) to provide the ability to remotely manage all of the registered users preferences and accessible information via a website or mobile application.

s) to provide a method that allows administrative users to place time restrictions on a registered user's ability to receive product samples.

t) to provide a method that allows administrative users to place quantity restrictions on a registered user's ability to receive product samples.

u) to provide a system and a method for linking user registration made on one machine to all machines on the system via a central repository and management system.

v) to provide system wide restrictions and limitations on sample programs and other membership benefits across all machines connected to a central system.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
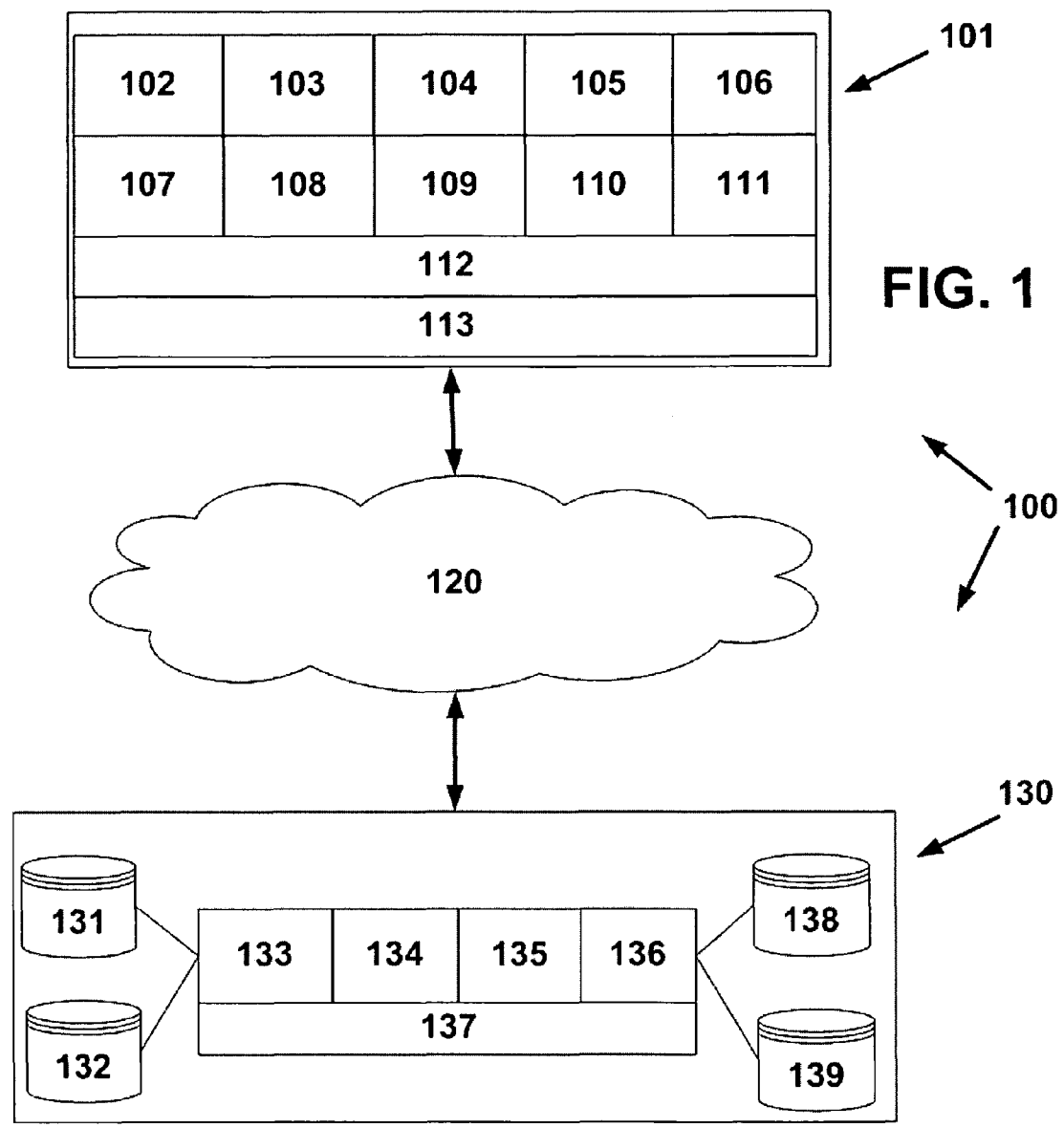
FIG. 1 is a block diagram of the system.
Figure 2:
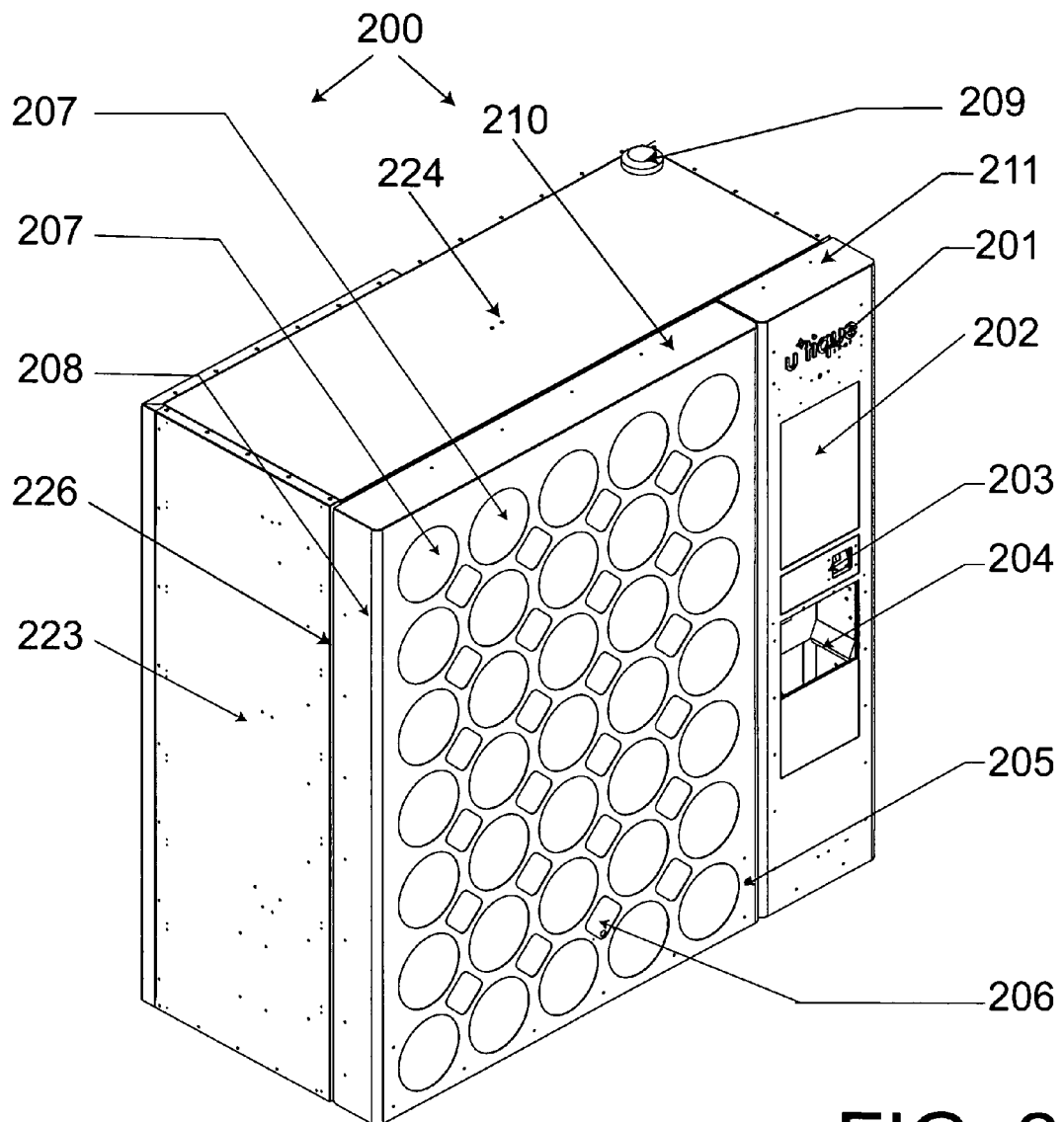
FIG. 2 is an isometric view of an assembled vending machine module.

With initial reference directed to FIGS. 1 and 2 of the appended drawings, a system consisting of a plurality of automated retail machines connected via a data connection to a centralized, backend operations center system has been generally designated by the reference numeral 100. At least one automated retail machine 101 is deployed in a physical environment accessible by a consumer who can interact with the machine 101 directly. There can be any number of machines 101, all connected to a single, remote logical operations center 130 via the Internet 120 (or a private network).

The operations center 130 can physically reside in a number of locations to meet redundancy and scaling requirements. The machine software is composed of a number of segments that all work in concert to provide an integrated system. Logical area 102 provides the interface to deal with all of the machine's peripherals such as sensors, keypads, printers and touch screen. Area 103 handles the monitoring of the machine and the notifications the machine provides to administrative users when their attention is required. Area 104 controls the reporting and logging on the machine. All events on the machine are logged and recorded so they can be analyzed later for marketing, sales and troubleshooting analysis. Logical area 105 is responsible for handling the machines lighting controls.

Logical area 106 is the Inventory Management application. It allows administrative users on location to manage the inventory. This includes restocking the machine with replacement merchandise and changing the merchandise that is sold inside the machine. Administrative users can set the location of stored merchandise and the quantity.

Logical area 107 is the retail store application. It is the primary area that the consumers use to interface with the system. This is the area that the majority of the processes described in FIGS. 3 through 9 occur. Logical area 108 handles the controls required to physically dispense items that are purchased on the machine or physically dispense samples that are requested by a consumer. Logical area 109 controls the inventory management system allowing authorized administrative users to configure and manage the physical inventory in the machine. Area 110 controls the payment processing on the machine. It manages the communication from the machine to external systems that authorize and process payments made on the machine. Area 111 is an administrative system that allows an authorized user to manage the content on the machine. The content can consist of text, images, video and any configuration files that determine the user's interaction with the machine.

The latter applications interface with the system through an application layer designated in FIG. 1 by the reference numeral 112. This application layer handles the communication between all of these routines and the computer's operating system 113. This layer provides security and lower level messaging capabilities. It also provides stability in monitoring the processes, ensuring they are active and properly functioning. Logical area 131 is the user database repository that resides in the operations center 130. This repository is responsible for storing all of the registered user data that is described in the following figures. It is logically a single repository but physically can represent numerous hardware machines that run an integrated database. The campaign and promotions database and repository 132 stores all of the sales, promotions, specials, campaigns and deals that are executed on the system. Both of these databases directly interface with the real-time management system 133 that handles real-time requests described in FIGS. 3 and 9. Logical area 134 aggregates data across all of the databases and data repositories to perform inventory and sales reporting. The marketing management system 135 is used by administrative marketing personnel to manage the marketing messaging that occurs on the system; messages are deployed either to machines or to any e-commerce portals. Logical area 136 monitors the deployed machines described in FIG. 2, and provides tools to observe current status, troubleshoot errors and make remote fixes. Logical area 137 represents the general user interface portion of the system. This area has web tools that allow users to manage their profiles and purchase products, items and services. The content repository database 138 contains all of the content displayed on the machines and in the web portal. Logical area 139 is an aggregate of current and historical sales and usage database comprised of the logs and reports produced by all of the machines in the field and the web portals.

FIG. 2 shows an automated retail vending machine 200 that was represented logically as 101 (FIG. 1). For purposes of vending machine hardware disclosure, the two following co-pending U.S. utility applications, which are owned by the same assignee as in this case, are hereby incorporated by references, as if fully set forth herein:

(a) Pending U.S. utility application Ser. No. 12/589,277, entitled "Interactive and 3-D Multi-Sensor Touch Selection Interface For an Automated Retail Store, Vending Machine, Digital Sign, or Retail Display," filed Oct. 21, 2009, by coinventors Mara Segal, Darrell Mockus, and Russell Greenberg, that was based upon a prior pending U.S. Provisional Application Ser. No. 61/107,829, filed Oct. 23, 2008, and entitled "Interactive and 3-D Multi-Sensor Touch Selection Interface for an Automated Retail Store, Vending Machine, Digital Sign, or Retail Display"; and, (b) Pending U.S. utility application Ser. No. 12/589,164, entitled "Vending Machines With Lighting Interactivity And Item-Based Lighting Systems For Retail Display And Automated Retail Stores," filed Oct. 19, 2009 by coinventors Mara Segal, Darrell Mockus, and Russell Greenberg, that was based upon a prior pending U.S. Provisional Application Ser. No. 61/106,952, filed Oct. 20, 2008, and entitled "Lighting Interactivity And Item-Based Lighting Systems In Retail Display, Automated Retail Stores And Vending Machines," by the same coinventors.

Again referencing FIG. 2, and as detailed in the above-mentioned copending utility applications, the display module 210 can be attached with a hinge 226 to a vending machine comprised of a rigid upright cabinet with rigid sides 223 and top 224, or the module can be mounted to a solid structure as a stand-alone retail display. The display module 210 forms a door that is hinged to the cabinet sides 223 adjacent a vertical control column 211. A variety of door configurations known in the art can be employed. For example, the display doors can be smaller or larger, and they can be located on one or both sides of the totem area. The display doors can have multiple square, oval, circular, diamond-shaped, rectangular or any other geometrically shaped windows. Alternatively, the display area can have one large display window with shelves inside.

A customizable, lighted logo area 201 (FIG. 2) is disposed at the top of column 211. Touch screen display 202 is located below area 201. Panel 203 locates the machine payment system, coin acceptor machine or the like. Additionally panel 203 can secure a receipt printer, keypad, headphone jack, fingerprint scanner or other access device. The product retrieval area 204 is disposed beneath the console 211 in a conventional compartment (not shown). A key lock 205, which can be mechanical or electrical such as a punch-key lock, is disposed beneath the face of the module 210. One or more motion sensors 206 are disposed within smaller display tubes within the console interior. There are a plurality of generally circular touchable product viewing areas 207 areas defined upon the outer the face of the casing 208 that are aligned with internal display tubes behind the product viewing surface areas. Areas 207 include proximity or touch sensors described hereinafter that are used for customer selection. The reference numeral 209 designates an exterior antenna that connects to a wireless modem inside the machine providing connectivity.

Figure 3:
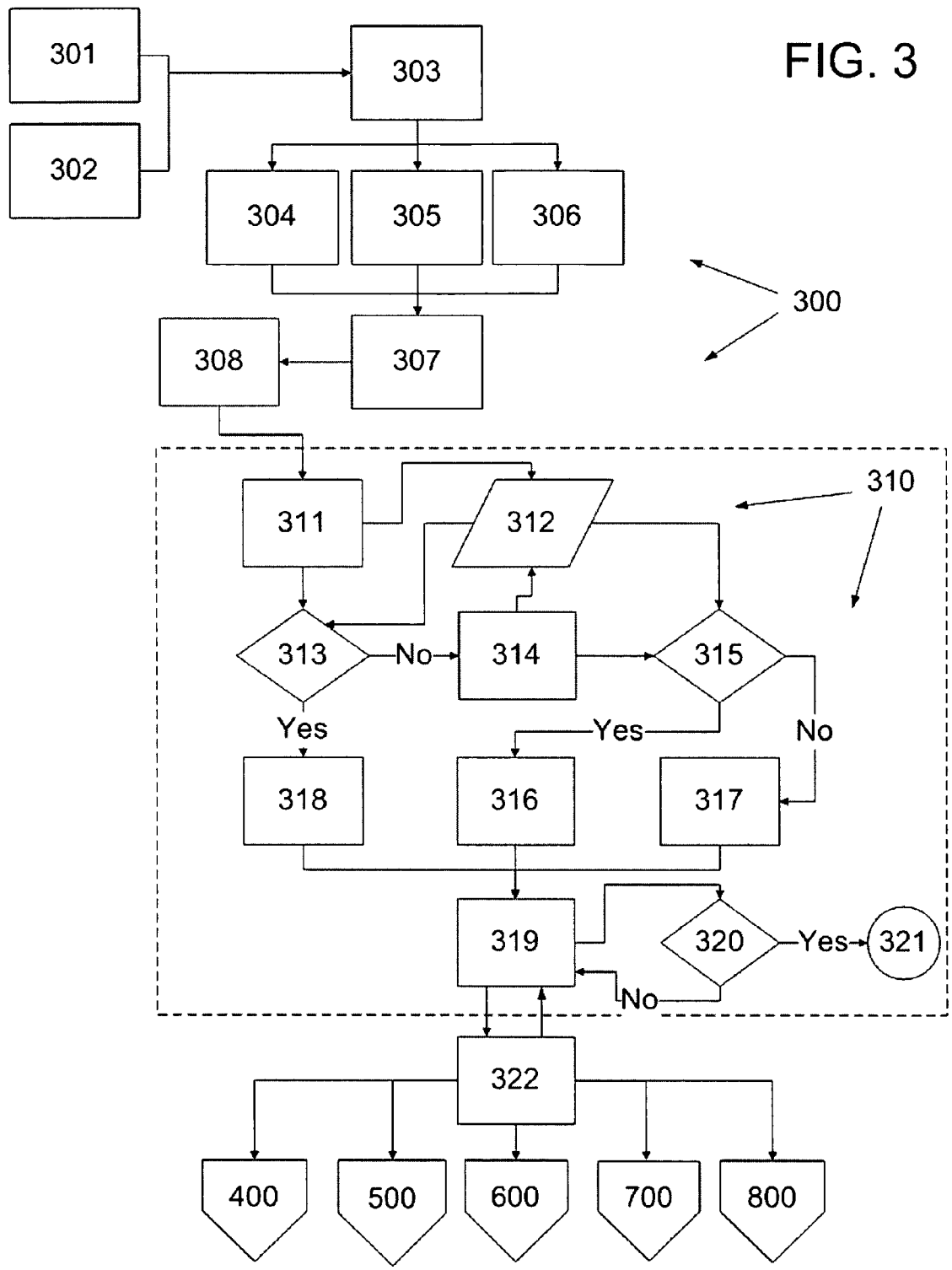
FIG. 3 is a software block diagram of the preferred "general user lookup process"

FIG. 3 illustrates a general user lookup subroutine 300 that determines whether a user is registered. Subroutine 300 begins on a deployed machine 101 (FIG. 1) when a user attempts to access an area or feature restricted to registered users of the system 301, or when a user actively touches a button or control on the touch screen (i.e., in area 102) indicating they wish to identify themselves as a registered user 302. This functionality takes place within the retail store application 107 (FIG. 1). The user is presented with a screen prompting them to register or identify themselves with an existing registration identification method in step 303. The user may use any of the accepted methods of identification as noted previously in this document.

Step 304 handles all methods that involve inserting or swiping an identifying piece of information such as a credit card, membership card, driver's license, etc. Step 305 handles all identification methods that are entered into the system via the touch screen and/or keypad devices. These methods typically include usernames and passwords. Step 306 handles any method that is sensed, detected or scanned such as wireless devices, fingerprints, facial recognition or wireless emitting entities such as smart cards. Each of these steps has their own error handling procedures that make sure the information is read or entered in correctly. Step 307 packages this information into a formatted message requesting identification verification. This step can include encrypting the data or using a hash function that converts a set or subset of the possibly variable-sized amount of input data into a small datum, usually a single integer that may serve as an index to the user record. The inputted data is never transmitted or stored in its raw form. From this point on, the full data set cannot be reverse computed to get the original value. Step 308 sends the identification authorization request to the central operations center 130 (FIG. 1) represented by the processes indicated by 310. It is received by the Real-time Management System 133 (FIG. 1) in step 311 that parses the message and extracts the identifying pieces of information used to lookup the user record based on the identification method supplied. Step 312 attempts to lookup the registered user stored in the user database repository 131 (FIG. 1). Step 313 examines the information received from the query in step 312. If an exact unique match was found based on the hash id, the process moves to step 318 where a message is formulated that indicates an exact match was found and the data being returned is a specific registered user associated with the identification information provided. If an exact match was not found, the system executes step 314 that attempts to determine if this user, while registered, is using an alternative method of identification that is not stored in the system yet by examining some of the non-unique information supplied, such as the name. For example, the user may be using a different credit card than they used the first time. In this case, the name matches but not the hash id calculated by the system to represent the data on the card. Step 314 attempts to use whatever identifying information sent to match registered user records in the user database repository 131 (FIG. 1). Since this partial information does not make a unique match, the result set will be an array of one or more registered user records or a null dataset in the event nothing is found that matches. This result set is tested in step 315. If no data was found that matched any of the provided information, a message is formatted that there is no registered user that matches the identifying information provided in step 317. If some results were found, step 316 formats a message that one or more registered users may match the information provided. The message will contain the registered user records of any potential match. Included in the method will be additional pieces of information that can be used by the local process on the machine sending the request to verify the user. Step 319 packages the message and sends to the machine that made the original authentication request. It then sets a timer, and waits for a receipt from the machine that the message was received. Step 320 monitors the elapsed time, and compares it to a value set by an administrative user in the configuration file. If the elapsed time exceeds that set time, the message is resent until the maximum number of attempts is reached according to the administrative configuration file, otherwise, the process terminates at 321. Step 322 occurs on the deployed machine represented logically as 101 (FIG. 1) that made the original request. It listens for a response from the Real-time Management System 133 (FIG. 1). If it receives a message, it sends a receipt message which is handled by the process in step 319. Step 322 directs the information received to subroutine processes 400, 500, 600, 700 or 800 that originated the request for the general lookup subroutine 300 to be executed, which are described below and detailed in FIGS. 4-8.

Figure 6:
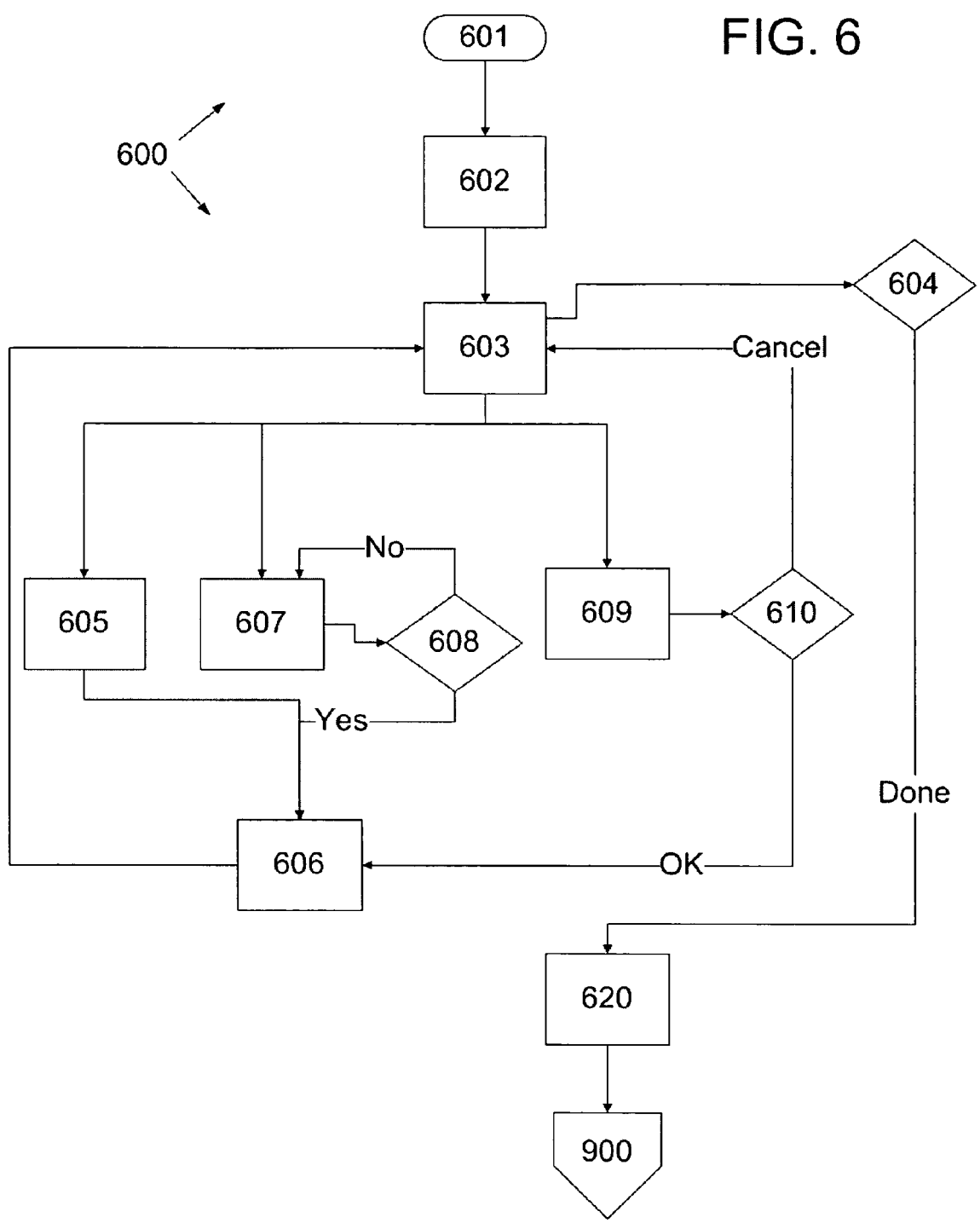
FIG. 6 is a software block diagram of the preferred "update account information" and "add additional identifying methods" processes.

Subroutine 400 (FIGS. 3, 4) is preferred for registering a new user. Subroutine 400 begins either when a user attempts to register as described above per subroutine 300, or when a user attempts to enter a system area that requires the user to be a member, as indicated by step 401, wherein the user is directed to the general lookup subroutine 300 (FIG. 3). The result set is returned to step 402 where it examines the data to determine if there were any matches found in the user database. If an exact match is found, that user is classified as a registered user, and the Update Account Information subroutine 600 commences. If the general lookup subroutine 300 does not indicate a preexisting unique, user account, step 403 checks to see if subroutine 300 returned an array of possible users in step 403. If an array of possible users is found, the step 404 prompts the user for a secondary piece of information based on the method they are using to identify themselves, and checks that against the information returned from the server for a possible match in step 404. Step 405 determines if the data matches any previously registered user's information. If there is a match, the user is directed to the Update Account Information Subroutine 600 (FIG. 6). If there is no match in step 405, the user is directed into the user registration process by prompting them to accept the required legal agreements concerning use of this system, privacy agreements, or any other possible legal agreement or acknowledgement in step 408. If in step 403, it is determined that no matches of any sort were returned from the general lookup process 300, then the system prompts the user for a secondary identifying method in step 406. Error handling is done in step 407 to ensure that the information is in a valid format. If it is not, the user is prompted to correct in the information in step 406, otherwise, the user is prompted to accept the legal agreements required to use the system in step 408.

Step 409 evaluates the user's answer to the question in step 408. If the user did not accept the legal agreement, they are not permitted to use the system and they will get a failed registration message in step 410. They are given the option of accepting the agreement again at step 408 or terminating the user registration process in step 411. If the user accepts the agreement, they are directed to step 412, where they are prompted for their acceptance of various types of marketing communication. The users selections are stored in a local memory in step 413 and the user is prompted to add additional forms of communication in step 414. This is an optional area where the user can add an additional form of contact such as a cell phone, mailing address, or any other mechanism through which he or she may be reached. Step 415 performs error checking on the information entered in step 414. If the information is not correct or has an error, the user can fix the issue, otherwise, the user is prompted with the option to indicate additional preferences in step 416. Optional preferences include information concerning which products or brands interest the user, categories of products frequently purchased, communication preferences, demographic data or any other marketing related information that the user volunteers. The data is recorded in local storage on the machine in step 417. In step 418, the local session variable is set to indicate that a registered user is now using the machine. This opens up access by the user to registered areas of the machine, and gives the registered user privileges that are associated with an account at the introductory level as they use the machine in a normal user session in step 419. When the application determines that the session is over through any means such as a completed transaction, idle period, a user-instigated end session (indicated though a control button on the touch screen), or any other terminating event, the session end subroutine 900 is initiated.

Subroutine 500 (FIG. 5) illustrates the preferred returning user identification process. It outlines the process whereby a user is identified on a machine, and associates their user session with their existing registered account. Identifying oneself as a registered user on a machine gives the user access to member restricted areas and benefits.

The returning-user identification process begins in step 501 when a user selects a control on the touch screen to indicate that they are a returning user, or the general lookup process 300 returned with an array of user data. The system checks if user data is present in step 502. If no user data is present the application prompts the user to identify themselves through a preferred method in step 503. The user can use any of the accepted methods of identifying themselves on a machine if they had previously filled out the proper information to do so. Accepted methods include the use of data on a credit card magnetic stripe, indicating a registered cell phone number with a personal identification number, inputting a user name and password, fingerprint scanning, or any other identification routine that provides a unique and secure combination. Step 504 verifies that this information was entered and read by the system correctly. If not, the user is prompted to again enter their information via step 503. If the information was read correctly, it is formatted and sent to the general lookup process 300.

In step 505, information returned from step 300 (FIG. 5) is examined. If no user data is found, the information supplied cannot be associated with any existing account, and the user will be routed to the new user registration process 400. If user data was found, step 506 determines if the general lookup process 300 found an exact match and returned a specific user GUID or an array of possible user GUIDs and associated user information. If a specific user was matched exactly to the information provided, the application triggers step 509. If an exact match was not found, the system will prompt the user for additional information from their profile in an attempt to securely match them up with existing user registration files in step 507. Step 508 determines if this matching was successful. If it was not, the user is directed to the new user registration process 400. If a user was successfully matched to information provided in step 506 or step 508, step 509 will be triggered. Step 509 will set the session variables on the local machine with the registered user's GUID. The user would be returned to their user session 510 on the machine. The user will now have access to member areas until the end of their session. Actions and transactions during this active and continuous session will be logged and noted on their account. When the application determines the session is over through any means such as a completed transaction, idle period, user instigated through an end session control button on the touch screen or any other terminating event, the session end process 900 is initiated.

Subroutine 600 (FIG. 6) allows a user to update and manage their account information. It accommodates various ways for a user to edit, update, and manage their account information. A user must have been previously registered and identified as a registered user on a machine in an active session in order to have access to this process.

Figure 4:
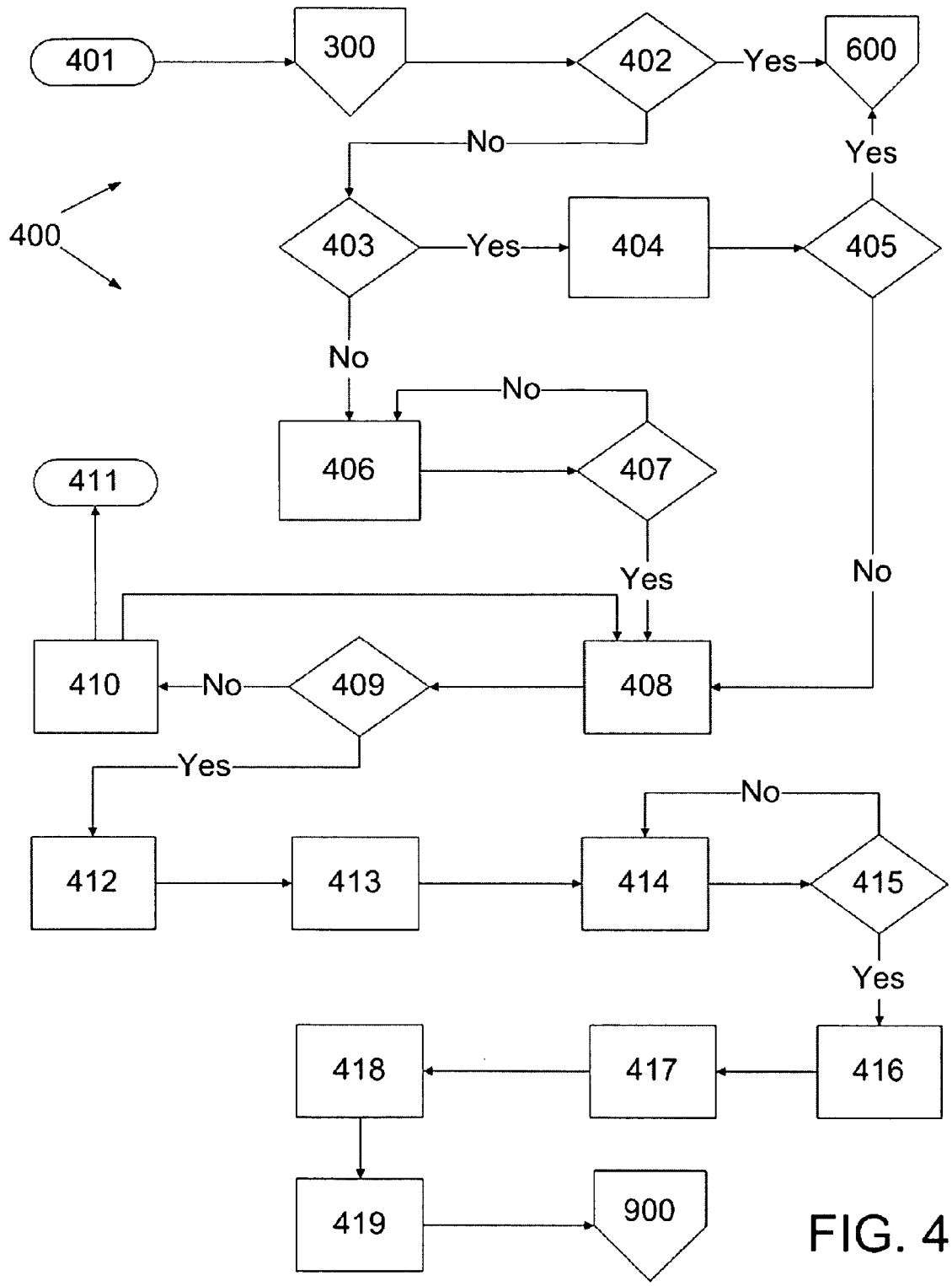
FIG. 4 is a software block diagram of the preferred "new user registration process"
Figure 5:
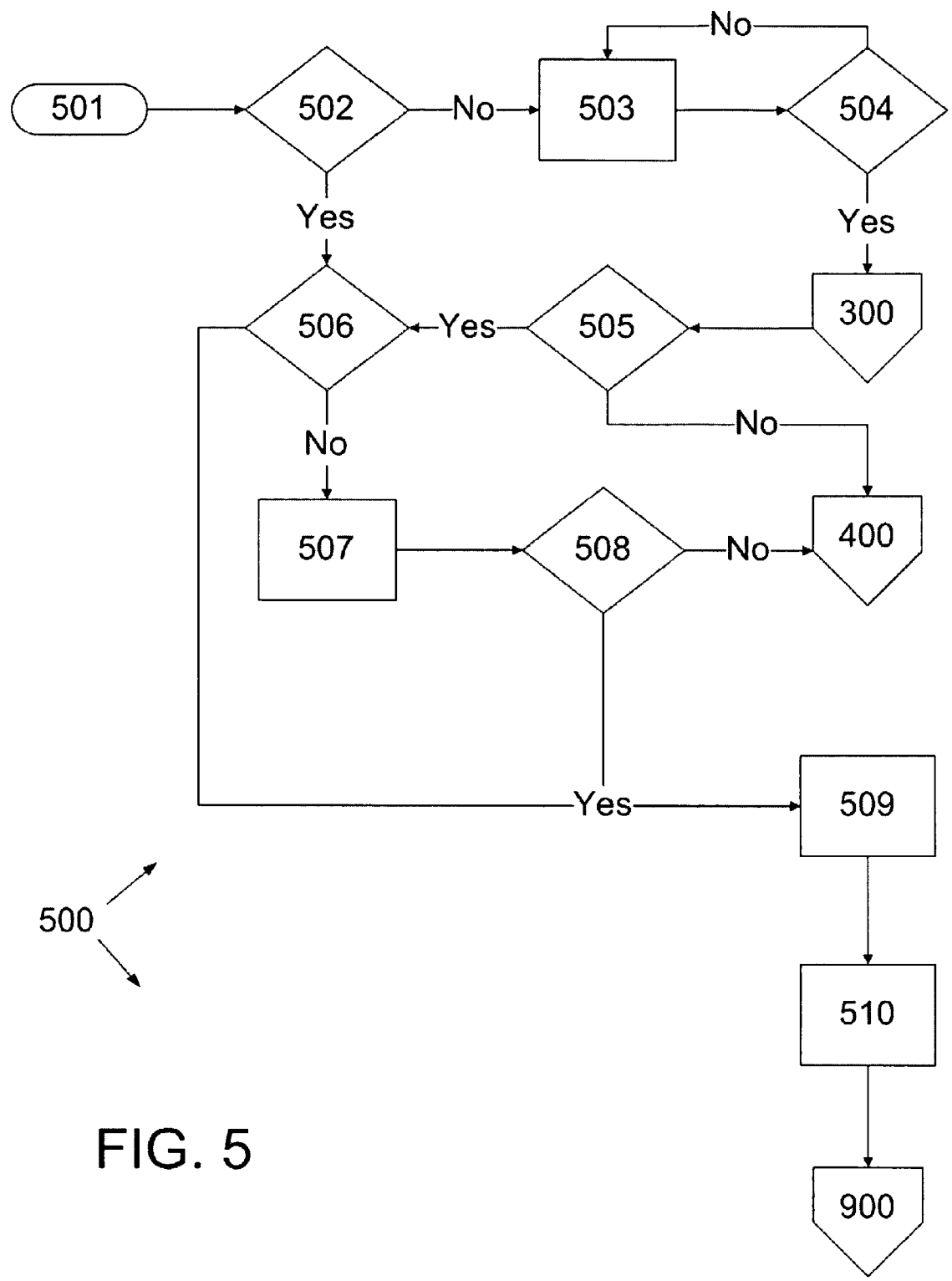
FIG. 5 is a software block diagram of the preferred "returning user lookup process"

The process begins in step 601 when the user selects a command button on the user interface that directs then into the update account information area, or the user is prompted automatically to this area in the case that it is determined that the user needs to update their account information. Reasons for automatically prompting a user to update their account status could be that the legal agreements they previously accepted have changed, new options or preferences are now available since their last user session, or that a specified time has elapsed since the last time a user has updated their information. Information is pulled from local storage on the machine and formatted for onscreen presentation in step 601. This locally stored information was previously retrieved by process 400 (FIG. 4). This screen displays their currently stored information, a summary of their information, or selections to specific segments of their account information. The user is prompted to edit information on the main management screen in step 603. From this step, they can edit multiple areas or indicates that they are finished, which triggers step 604 and sends the user back to their user session. If the elects to update their marketing message preferences, they are routed to step 605 where they may make changes. Step 606 stores the changes made in a local storage area on the machine. Afterwards, the user is returned to step 603 where they may indicate that they are done in step 604, or they may make another selection. Alternatively, from step 603, the user may opt to add an additional identifier method to their user profile in step 607. The identifier method can be any of the previously mentioned methods that provide a unique and secure identifying mechanism. Step 608 validates this information and provides error checking. If there are problems, the user is prompted to correct the problems. If there are no problems, the user is directed to step 606 that saves the new information in a local storage area where it will later be uploaded to the central repository during the end of user session 900. After the data is stored locally in step 606, the user is returned to the main user management area 603. The user may also opt to update their demographic profile, contact information, retail profile or product and brand preferences in step 609. After the changes, the user can confirm the changes and store them locally in step 606, or they can cancel the operation returning to step 603 where they may make another selection or complete their updating selecting that they are done triggering step 604. The user is then returned to their user session 620. When the application determines the session is over through any means such as a completed transaction, idle period, user instigated through an end session control button on the touch screen or any other terminating event, the session end process 900 is initiated where the information stored locally in this process is uploaded to the user repository 131 (FIG. 1).

Figure 7:
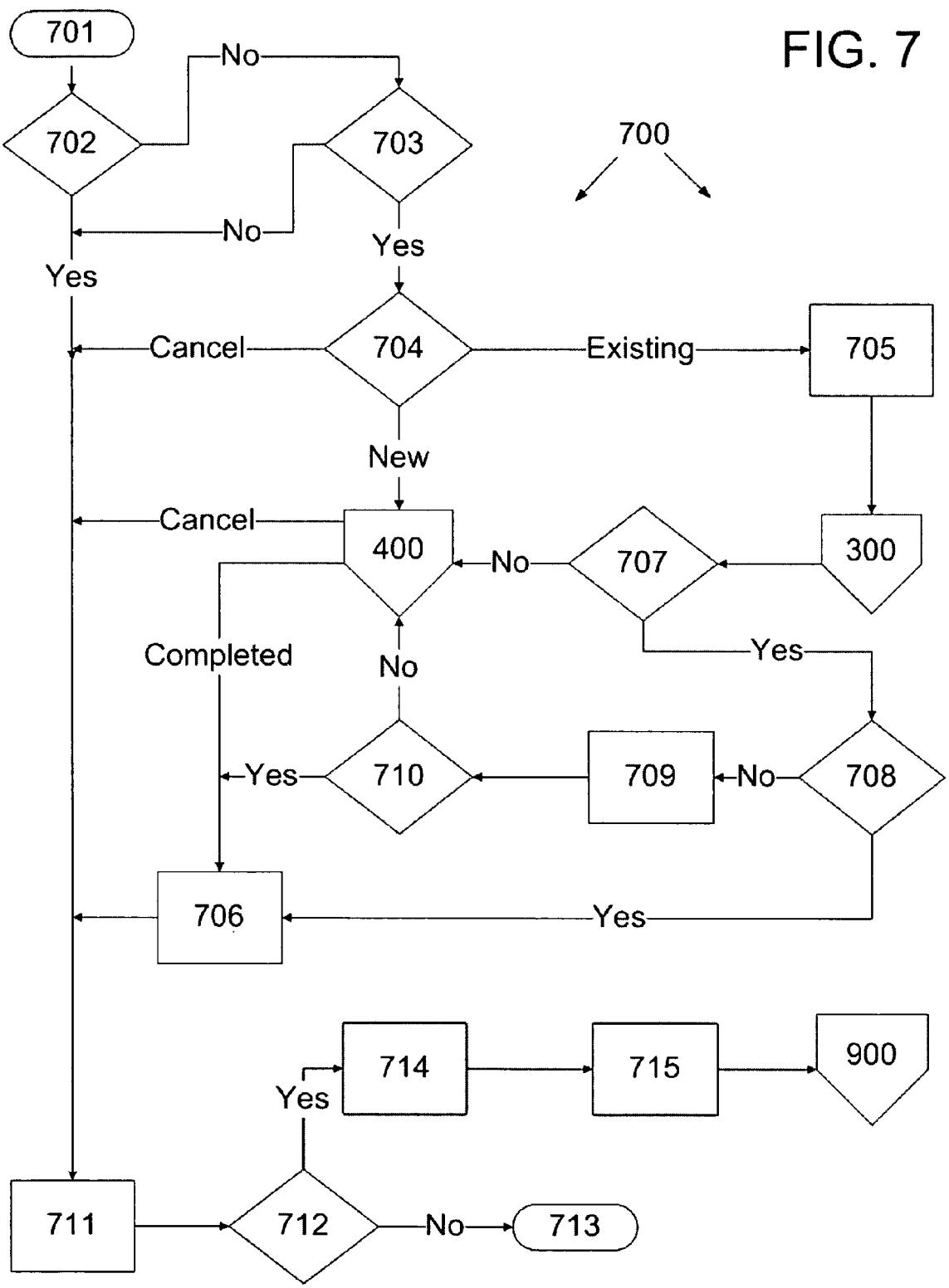
FIG. 7 is a software block diagram of the preferred "member transaction process"

FIG. 7 illustrates the preferred method of conducting a transaction to determine if a user is a registered user or not. This method provides a way to link transactions on a machine to a registered user if they previously registered. The benefit of this method is that if a user was already registered with the same payment method they are currently using, they are automatically logged into the system. If they are not a registered user, they are given the option to register with the system before completing their transaction.

The payment subroutine 700 (FIG. 7) begins when a user indicates that they are ready to pay for their purchase in step 701. Step 702 checks if they are already identified in the current session as a registered user of the system. If the current user is identified as a registered user of the system, they proceed directly to the standard checkout validation process 711. The checkout validation process is a standard vending process ensures payment is received before products or merchandise are vended. The system described here uses an external payment authorization system supplied by a third party vendor. These third party vendors have systems that will receive payment information (e.g. identifying credit information from a credit card) and determine if it is a valid payment method and if the amount to be charged is within the credit limits of this card. The process is the same for debit transaction where the identifying debit information is matched to a debit account, validated through their own processes and analyzed to see that the amount being debited is available. The checkout process 711 receives a success response from this third party system if the amount has been charged or debited. If a successful transaction occurs, the selected merchandise is vended. If a failure response is received for any reason, the transaction is suspended and the user is notified. At this point they may try to use another form of payment or cancel the transaction. The system can use any one of these third party payment authorization systems that are widely available to purchase as a service.

If the current user is not already identified with the machine as an active user, they are prompted if they want to register or identify themselves as a registered user on the system in step 703. If they do not, the event is logged, and the user is directed back to the transaction process 711 as described above. If the user wishes to register or indicates they are an existing registered user, they are queried to specify which one they are in step 704 or select that they wish to cancel. If they select cancel, the user is directed to the checkout process 711. If the user indicates they are an existing registered user, they are asked to identify themselves with the system in step 705. The information is captured and a validation request is sent to the general lookup process 300 (FIG. 3).

The data returned from the general lookup process is analyzed in step 707. If no user is found, the user is directed to the new user registration process 400 (FIG. 4). If some user data was found, step 708 determines if an exact match to a registered user was found. If a single registered user was found that exactly matched to the data provided, the user proceeds to the standard checkout process 709. If an exact match was not found, the general lookup process returned an array of possible registered users and the user is directed to step 710 where they are prompted for additional information that will be user to try to match the current user with an existing user registration. If the information provided by the user did not match up with any record in the array returned by the general lookup process, the user is directed to the new user registration process 400 (FIG. 4) where they may complete the registration process or cancel. If the validation data entered in by the user in step 710 matches a record in the array or if the user successfully completes the new user registration process 400 (FIG. 4), the event is logged and the session variable is set to indicate the current user is a registered user in step 706. The process then continues to the checkout process 711 where the user's payment information is validated as described above.

After the user completes the standard checkout process, the session variable is checked to determine if the current user is a registered user. If they are not, the process terminates in step 713. If the current user is a registered user, step 714 records the transaction information in local storage associating the information with the registered user's GUID. The process then proceeds to step 715 that displays summary information of the transaction to the user. This information may include information such as the total accumulated rewards points, special offers targeted at that registered user or additional options available to registered users which may be configured by administrative users of the system. The user's session is then automatically terminated by step 715 and the process ends with the session end process 900.

Figure 8:
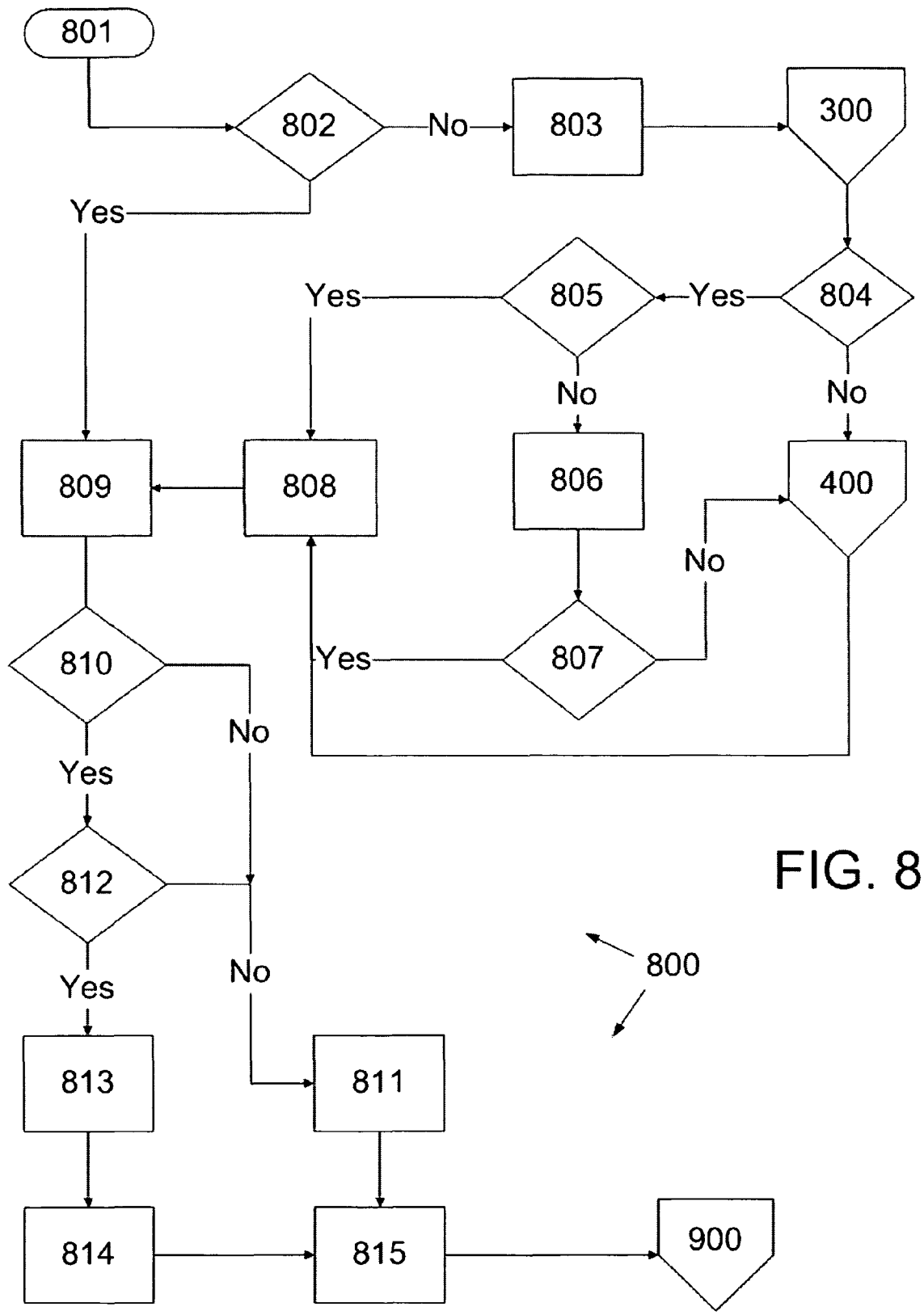
FIG. 8 is a software block diagram of the preferred "sample dispensing process"; and, FIG. 9 is a software block diagram of the preferred "end of session process."
Figure 9:
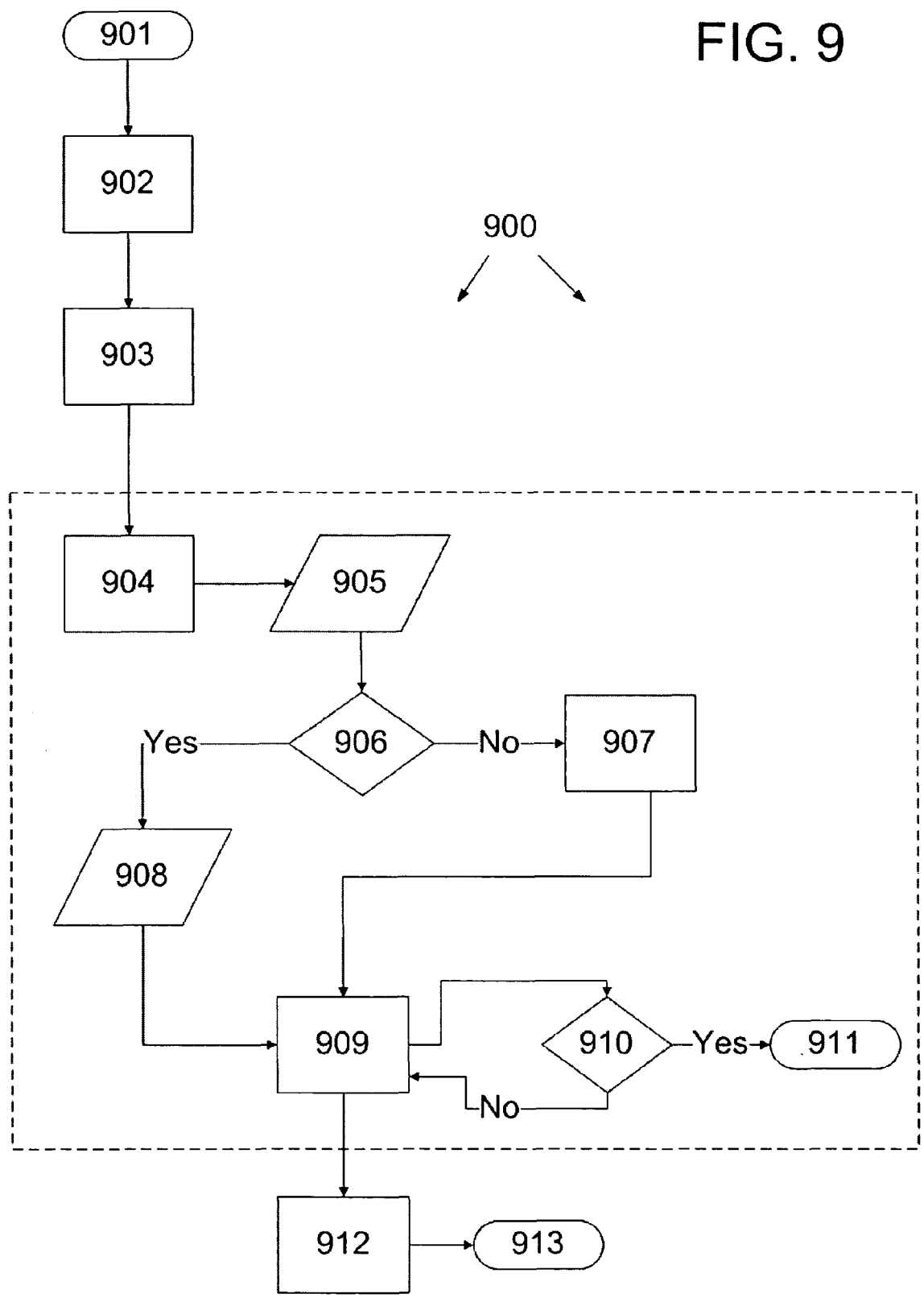

FIG. 8 illustrates the preferred method of handling sample dispensing within the context of the customer retention system outlined herein. The user registration process is compulsory. A user must register in order to receive a free sample on the system. A user must either register with the system or have previously registered with the system in order to be eligible for a sample. The user is also subject to the rules of the program which may be configured to restrict the dispensing of samples. The user restrictions on the sample program can be programmed into the system through a graphical user interface by non-technical personnel. This system allows an administrative user to set time and quantity limits on the samples that are dispensed per user. The time limits restrict the time between dispensing samples. For example, member users can be restricted to receiving only one sample product per 24 hour period. The quantities of a particular type of sample can also be restricted. For example, a user may be restricted to receiving only one type of sample per member account. The restrictions are enforced across all machines on the system via the centralized operations center described in FIG. 1. This is advantageous as a consumer within range of a number of deployed machines cannot abuse the sample dispensing system.

The membership sample subroutine 800 begins when a user attempts to obtain a sample from the machine in step 801 (depicted logically as 101 in FIG. 1 and physically as 200 in FIG. 2). The current session variables are checked in step 802 to see if the current user is identified as a registered user. If the current user is not identified as being a registered member, they are prompted in step 803 to identify themselves using an acceptable method of identification. This information is sent to the general lookup process 300 (FIG. 3). The results of the lookup are tested in step 804. If general lookup subroutine 300 does not produce a matching result set, the user is sent to the new registration subroutine 400 (FIG. 4). If the general lookup process produces a result set of an array of one or more member user registration data sets, it is checked in step 805. If the result set does not contain an exact match, the user is prompted for additional identifying information in step 806. Step 807 examines the additional information entered by the user. If there is not a match of the additional information to any of the result set returned by the general lookup process, the user is directed to the new user registration process 400 (FIG. 4). If the information does match one of the registered user data sets returned by the general lookup process, then the user is directed to step 808 where the session variable is set indicating that the current user is a registered member. Step 808 will also store the user data received in step 803 in the matched user record. This will permanently associate the new identifying data with the user's registered account data. If step 805 determines that there is an exact match of a registered user's data record, the user would proceed to step 808 where the session variable is set indicating that the current user is a registered member. The user is then directed to step 809 that retrieves the user's sample dispensing history that is attached to their user record retrieved by the general lookup process 300 (FIG. 3). This data is matched against the administrative settings for possible limits placed on the sample dispensing program. If step 802 determined that the current user was a registered user, it will have sent the user to step 809 bypassing any additional lookups. Step 810 determines if the registered user is within the time constraints set on the sample program. The user is sent to step 811 if the user did not meet the limits set on the time meaning the administrative set time has not yet elapsed since the user received their last sample. Step 811 displays a user message that they are not eligible for the dispensing of that sample at this time. If the registered user did meet the time constraints placed on the sample being dispensed, they proceed to step 812 that determines if the registered user meets the quantity constraints placed on the sample they are attempting to receive. If the user has exceeded the allowed quantity for the particular sample they are attempting to receive, they do not meet the quantity limit rules and are directed to step 811 that displays a message to the user that they are not eligible to receive the sample they requested at this time. If step 812 determines they are eligible to receive this sample, the user proceeds to the system sample dispensing procedure that handles the physical dispensing of the sample product in step 813. Step 814 records the results of the sample dispensing process and updates the current user's sample dispensing history data set. The user then returns to their current user session 815. When the application determines the session is over through any means such as a completed transaction, idle period, user instigated through an end session control button on the touch screen or any other terminating event, the session end process 900 is initiated where the information stored locally in this process is uploaded to the user repository 131 (FIG. 1).

Subroutine 900 (FIG. 9) handles a registered user's data at the end of a user session on a machine. When the application determines the session is over through any means such as a completed transaction, idle period, user instigated through an end session control button on the touch screen, or any other terminating event, the session end is initiated. This process gathers all new data logged during a registered user's session and sends this information back with the machine identification number to the central server and user repository to store. This information resides there until it is retrieved by the user initiating a new user session on a machine, accessed by an administrative user for management purposes, or used by an automated or manual process for marketing or data analysis purposes. After an acknowledgement that the information was successfully received and stored in the user repository, the local machine removes the locally stored data from its memory.

The session end subroutine 900 begins when the application determines that a registered user's session has ended 901. Step 902 processes all of the newly recorded information associated with the registered user's account. The current machine identification number is attached to this information. Step 903 packages this information into a formatted message and sends to the central operations center 130 (FIG. 1) where it is processed by real-time management system 133 (FIG. 1) and stored in the user database repository 131 (FIG. 1). Steps 904, 905, 906, 907, 908, 909, 910, and 911 take place in the central operations center 130 (FIG. 1). The computations are performed by the real-time management system 133 (FIG. 1) and the data storage is recorded in the user database repository 131 (FIG. 1).

Step 904 parses the incoming message and notes the user identification parameters and the machine identification number. Step 905 users the user information to locate the correct user record. Step 906 determines if a user is found. If a user is not found, step 907 stores the information in a temporary folder where an administrator will manually analyze it at a later time. If step 906 determines that a user record was successfully found, step 908 stores the information in the user database repository 131 (FIG. 1). Step 909 creates a message that the information was received and stored successfully in the user database, sends that message to the machine that initiated the original message and waits for a response. Step 912 occurs on the originating machine. It receives the message, removes the user data recorded in the session from the local machine and sends an acknowledgement response back to the central operations center. The process on the local machine then terminates 913. If an acknowledgement message is received during the specified time, the process ends in step 911. If the specified time elapses and no acknowledgement message is received, step 909 will resend the message.

From the foregoing, it will be seen that this invention is well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A vending system comprising:
   a communication network;
   a centralized database accessible through said network that stores inputted customer data; and,
   a plurality of remote vending machines, retail displays, and automated retail stores connected to the network that access said database, each of said vending machines, retail displays, and/or automated retail stores comprising:

a display module containing items to be vended and a plurality of touchable product viewing areas;

means for physically dispensing items;

a computer for activating and controlling the vending machine, the computer comprising means for inputting customer data, the means for inputting data selected from the group consisting of magnetic card readers, RFID readers, Bluetooth receiving units, touch screens, keypads, motion sensors, and touch sensors mounted in the housing;

software run by said computer that communicates with said database for establishing customer profiles in response to data input, the software comprising:

a subroutine for recognizing registered users and for registering new users by generating a global unique identifier (GUID) for individual customers that uniquely identifies the user from personally identifiable information such as parts of a credit card number, a non-identifying calculated number based off that number, a user's name, a cell phone number, email addresses, MAC addresses from wireless enabled devices; and, subroutines for activating said means for physically dispensing items in response to preselected conditions associated with each GUID;

wherein said subroutine for recognizing registered users and for registering new users comprises the steps of:

executing a user lookup subroutine that determines whether a user is registered, the user lookup routine comprising the steps of:

recognizing when a user attempts to access an area or feature restricted to registered users of the system or when a user actively touches the touch screen indicating they wish to identify themselves as a registered user;

presenting a screen prompting users to register or identify themselves;

collecting identifying information including user names, passwords, or credit card, membership card, and/or driver's license information;

transmitting information from said latter step to said database;

determining if a match exists in said database;

if a match is found by said database, recognizing a registered user and updating their account;

wherein if a match is not found by said database, steps attempt to identify an array of possible users, and if an array of possible users is found, steps prompt the user to input secondary information to further identify themselves, and steps check secondary information to determine a possible match, wherein if a match is found, steps direct the user to update his or her account information, and, if a match is not found steps direct the user to the user registration process.

2. The vending system as defined in claim 1 wherein said step of directing the user to a registration process includes the steps of:

presenting a legal agreement and requesting acceptance;

evaluating the user's answer to preceding step;

if the user did not accept the legal agreement, denying use of the system and providing a failed registration message;

if the user accepts the agreement, prompting the user to input additional information and preferences; and providing the registered user privileges associated with an account on the machine.

3. A vending system comprising:

a communication network;

a centralized database accessible through said network that stores inputted customer data; and, a plurality of remote vending machines, retail displays, and automated retail stores connected to the network that access said database, each of said vending machines, retail displays, and/or automated retail stores comprising:

a display module containing items to be vended and a plurality of touchable product viewing areas;

means for physically dispensing items;

a computer for activating and controlling the vending machine, the computer comprising means for inputting customer data, the means for inputting data selected from the group consisting of magnetic card readers, RFID readers, Bluetooth receiving units, touch screens, keypads, motion sensors, and touch sensors mounted in the housing;

software run by said computer that communicates with said database for establishing customer profiles in response to data input, the software comprising:

a subroutine for recognizing registered users and for registering new users by generating a global unique identifier (GUID) for individual customers that uniquely identifies the user from personally identifiable information such as parts of a credit card number, a non-identifying calculated number based off that number, a user's name, a cell phone number, email addresses, MAC addresses from wireless enabled devices; and, subroutines for activating said means for physically dispensing items in response to preselected conditions associated with each GUID; wherein said subroutine for recognizing registered users and for registering new users comprises the steps of:

executing a user lookup subroutine that determines whether a user is registered, the user lookup routine comprising the steps of:

recognizing when a user attempts to access an area or feature restricted to registered users of the system or when a user actively touches the touch screen indicating they wish to identify themselves as a registered user;

presenting a screen prompting users to register or identify themselves;

collecting identifying information including user names, passwords, or credit card, membership card, and/or driver's license information;

transmitting information from said latter step to said database;

determining if a match exists in said database;

if a match is found by said database, recognizing a registered user and updating their account;

wherein if a match is not found by said database, steps attempt to identify an array of possible users, and if an array of possible users is found, steps prompt the user to input secondary information to further identify themselves, and steps check secondary information to determine a possible match, wherein if a match is found, steps direct the user to update his or her account information, and, if a match is not found steps direct the user to the user registration process;

wherein said step of directing the user to a registration process includes the steps of:

presenting a legal agreement and requesting acceptance;

evaluating the user's answer to preceding step;

if the user did not accept the legal agreement, denying use of the system and providing a failed registration message;

if the user accepts the agreement, prompting the user to input additional information and preferences; and providing the registered user privileges associated with an account on the machine;

wherein said step of determining if a match exists in said database comprises a subroutine for determining if a user, while registered, failed to be recognized because he or she used an alternative method of identification that is not stored in the database system yet.

4. The vending system as defined in claim 3 wherein said software comprises a subroutine for preventing abuse of a free sample dispensing program in an automated vending machines, the last mentioned subroutine comprising:

steps for recognizing when a user requests a sample;

steps for querying said database to determine if the last mentioned user is a registered user;

steps for requiring unregistered users to register;

steps for establishing rule sets governing the qualification of registered users to obtain specific free samples;

steps for querying said database to determine if the registered user qualifies for specific free samples in accordance with said rule sets;

steps for vending qualified samples to qualified registered users when said rule sets are satisfied;

steps for storing information about dispensed qualified samples in said database proximity or touch sensors described hereinafter that are used for customer selection.

* * * * *